United States Patent
Cosenza et al.

[11] Patent Number: 5,943,017
[45] Date of Patent: *Aug. 24, 1999

[54] DUAL NEAR-FIELD FOCUSED ANTENNA ARRAY

[75] Inventors: John M. Cosenza, St. James; Michael Kane, Ridge; Robert Silvern, Dix Hills, all of N.Y.

[73] Assignee: AIL Systems, Inc., Deer Park, N.Y.

[*] Notice: This patent is subject to a terminal disclaimer.

[21] Appl. No.: 08/939,426

[22] Filed: Sep. 29, 1997

Related U.S. Application Data

[63] Continuation-in-part of application No. 08/571,811, Dec. 13, 1995, Pat. No. 5,673,052.

[51] Int. Cl.$^6$ ................................................ H01Q 1/38
[52] U.S. Cl. .................................. 343/700 MS; 343/778; 343/853
[58] Field of Search ........................... 343/700 MS, 850, 343/853, 777, 778, 795, 813, 814, 840; H01Q 1/38

[56] References Cited

U.S. PATENT DOCUMENTS

| | | |
|---|---|---|
| 3,999,182 | 12/1976 | Moeller et al. . |
| 4,074,270 | 2/1978 | Kaloi . |
| 4,450,449 | 5/1984 | Jewitt . |
| 5,001,493 | 3/1991 | Patin et al. . |
| 5,039,994 | 8/1991 | Wash et al. . |
| 5,157,393 | 10/1992 | Fox et al. . |
| 5,287,117 | 2/1994 | Posluszny . |
| 5,404,145 | 4/1995 | Sa et al. . |
| 5,418,541 | 5/1995 | Schroeder et al. . |
| 5,673,052 | 9/1997 | Cosenza et al. . |

*Primary Examiner*—Don Wong
*Assistant Examiner*—Tho Phan
*Attorney, Agent, or Firm*—Hoffmann & Baron, LLP

[57] ABSTRACT

A communication system for transferring data through the air over a relatively short fixed distance comprising a transmitting antenna which comprises a leaky coaxial cable for radiating electromagnetic energy modulated with data to be transferred; and a plurality of non-linear fixed beam array antennas for receiving the modulated electromagnetic energy from the leaky coaxial cable. The plurality of fixed beam array antennas are juxtaposed with the transmitting antenna such that the transmitting antenna extends at least partially through the near-field regions of the plurality of fixed beam array antennas. The communication system also comprises a selection means which determines which radio frequency output from the plurality of non-linear fixed beam array antennas exhibits the greatest radio frequency power and outputs that particular radio frequency output to a receiver. Also described is a method of increasing the performance of an antenna system, which comprises the steps of inputting radio frequency signals from a plurality of antennas, selecting that radio frequency signal which comprises the greatest radio frequency power, and outputting the radio frequency signal comprising the greatest radio frequency power.

15 Claims, 7 Drawing Sheets

DUAL NEAR-FIELD FOCUSED ANTENNA ARRAY

CROSS-REFERENCE TO RELATED APPLICATION

This application is a continuation-in-part application of patent application Ser. No. 08/571,811, which was filed on Dec. 13, 1995, now U.S. Pat. No. 5,673,052, issued on Sep. 30, 1997.

BACKGROUND OF THE INVENTION

The present invention relates to antenna systems, and in particular to an antenna system which dynamically selects the output with the greatest radio frequency power from two or more fixed beam array antennas focused in the near field.

The focused transfer of electromagnetic energy over a relatively short distance in free space is desirable in systems where mechanical connectivity between data transfer points is not feasible due to physical constraints of the system. For example, in the locomotive environment, it is desirable to transmit data from a video camera mounted at a station platform to a receiving unit located on a locomotive car, which may be moving in relation to the platform or which may be stationary. In the fixed beam array antennas of the present invention, a transmitting antenna in the form of a leaky coaxial cable is disposed linearly along the train track, and the video data to be transmitted to the receiving unit on the stationary or moving car is modulated on an electromagnetic wave carrier operating in the microwave frequency region. It is therefore required to have a receiving antenna located relatively near but not in contact with the leaky coaxial cable. The fixed beam array antenna may be in motion relative to the leaky coaxial cable while the system transmits data across the link established thereby.

Again, due to the physical constraints of the system, the electromagnetic signal emanating from the leaky coaxial cable is of relatively low power, typically in the range of −90 dBm. It is thus critical to utilize an antenna with a gain as high as practicable while keeping the size of the antenna relatively small for physical as well as economic considerations.

It is therefore an object of the present invention to provide an antenna which is useful for receiving focused electromagnetic energy from a point in its near field that is inexpensive, small and practical to manufacture.

Phased array antennas are used in the art in order to maximize gain when required by coherently adding signals incident on each constituent element of the array. Moreover, linear phased array antennas are well known in the art and are useful in forming a beam in the far field of the antenna and electronically scanning the beam by varying the phase shift across the array in a linear fashion. For example, U.S. Pat. No. 3,999,182 teaches such an antenna useful in aircraft landing systems operating in the microwave frequency range.

Linearly phase shifted array antennas are not useful, however, in operating in the near field, and in particular, are not useful in obtaining a fixed beam focused signal with relatively high gain for signals of relatively low power, since as array aperture increases in size (which provides an increase in antenna gain), the distance at which the array is focused increases. This limits the efficacy of high gain antennas at shorter distances.

With respect to applications such as the locomotive environment described above, lateral and vertical displacement of the locomotive as it traverses a set of train tracks will generally result in variations in the distance between the leaky coaxial cable disposed linearly along the train track and the antenna mounted on the locomotive. Since the focal point of the antenna is fixed, variations in this distance may lead to poor reception of the desired signal.

It is therefore an object of the present invention to provide an antenna system which is tolerant of variations in the distance between the antenna and the transmitting unit in its near field.

SUMMARY OF THE INVENTION

The present invention is an antenna system comprising a plurality of antennas, each of said antennas outputting an associated radio frequency signal and comprising a length; and means for selecting from said plurality of antennas said radio frequency signal comprising the greatest power and outputting said selected radio frequency signal. In one aspect, the plurality of antennas comprises a plurality of fixed beam array antennas focused at a focal point located in a near field region of said plurality of fixed beam array antennas, each of which comprises a plurality of conductive patch elements arranged in a linear fashion and juxtaposed such that at least one of said patch elements is located closer to a focal point of said patch elements than at least one other of said patch elements; means for coherently adding signals obtained from each of said patch elements comprising a power divider; and means for phase shifting, prior to being added, said phase of said signal obtained from each patch element located relatively closer to said focal point relative to said phase of said signal obtained from each patch element located relatively further away from said focal point such that said signals are coherently added together substantially in phase by said means for coherently adding signals, said means for phase shifting being coupled between said plurality of patch elements and said means for coherently adding signals.

In another aspect of the invention, the means for selecting comprises means for comparing amplitudes of each radio frequency signal, and outputting a control signal indicative of that radio frequency signal comprising the greatest amplitude; and means for switching that radio frequency signal comprising the greatest amplitude based upon said control signal, and outputting said radio frequency signal comprising the greatest amplitude, thereby outputting said radio frequency signal comprising the greatest radio frequency power.

DETAILED DESCRIPTION OF THE PREFERRED EMBODIMENT

Figure 1:
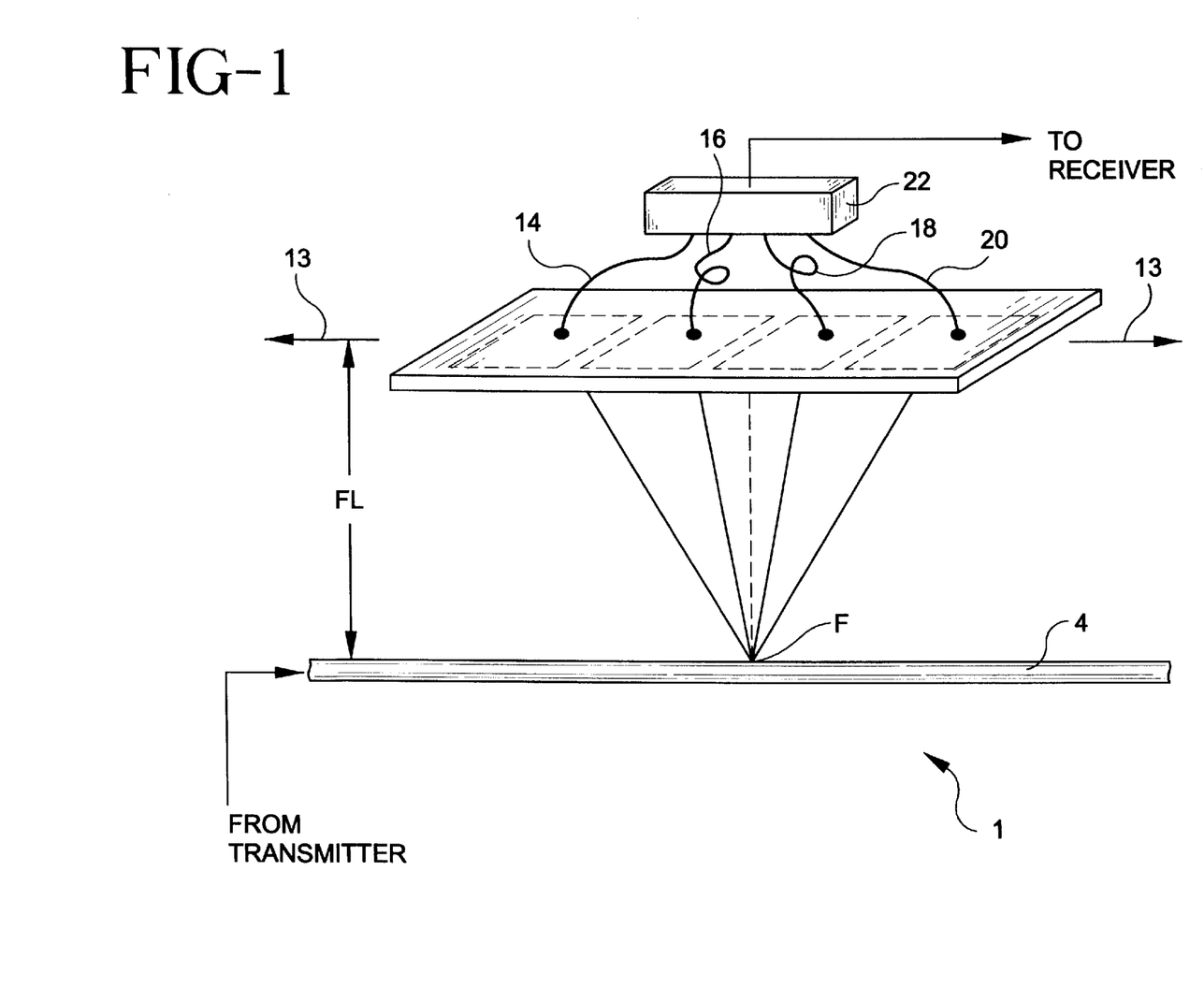
FIG. 1 is a diagram of a first embodiment of an antenna system in accordance with the present invention.

FIG. 1 illustrates a first embodiment of an antenna communication system 1 utilizing the non-linear phase shift principles of the present invention with a single antenna 10. The antenna system 1 comprises a transmitting antenna in the form of a leaky coaxial cable 4, which is linearly disposed along the length of a train track (not shown). The leaky coaxial cable 4 is connected to a transmitter (not shown) and serves to radiate electromagnetic signals in the form of a modulated microwave carrier in a fashion well known in the art.

In general, the gain obtained with long-wire antennas, as exemplified by the leaky coaxial cable 4 of the present invention, is not as great, when the space available for the antenna is limited, as can be obtained from multi-element arrays. However, the long-wire antenna has advantages of its own that tend to compensate for this deficiency. The construction of long-wire antennas is simple both electrically and mechanically, and there are no particularly critical dimensions or adjustments. A long-wire antenna will work well and provide satisfactory gain and directivity over a wide frequency range; in addition, it will accept power and radiate well on any frequency for which its overall length is not less than approximately a half wavelength.

Between two directive antennas comprising the same theoretical gain it has often been found that the long-wire antennas seem more effective in transmission. One possible explanation is that there is a diversity effect with a long-wire antenna because it is spread out over a large distance, rather than being concentrated in a small space. This may raise the average level of transmitted energy for ionospheric-propagated signals. Another factor is that long-wire antennas have directive patterns that are sharp in both the horizontal and vertical planes, and tend to concentrate the radiation at the low vertical angles that are most useful at higher frequencies. This is an advantage that some types of multi-element arrays do not have.

Whether the long-wire antenna is a single wire running in one direction or is formed into a V, rhombic, or some other configuration, there are certain general principles that apply and some performance features that are common to all types. The first of these is that the power gain of a long-wire antenna as compared with a half-wave dipole is not considerable until the antenna is really long (i.e. its length is measured in wavelengths rather than in a specific number of feet). The reason for this is that the fields radiated by elementary lengths of wire along the antenna do not combine, at a distance, in as simple a fashion as the fields from half-wave dipoles. There is no point in space, for example, where the distant fields from all points along the wire are exactly in phase (as they are, in the optimum direction, in the case of two or more collinear or broadside dipoles when fed with in-phase currents). Consequently, the field strength at a distance is always less than would be obtained if the same length of wires were cut up into properly phased and separately driven dipoles. As the wire is made longer, the fields combine to form an increasingly intense main lobe, but this lobe does not develop appreciably until the wire is several wavelengths long as in the leaky coaxial cable 4 of the present invention. Also, the greater the length, the smaller the angle with the wire at which maximum radiation occurs.

The gain in decibels of a long-wire increases almost linearly with the length of the antenna. The gain does not become appreciable until the antenna is about four wavelengths long, where it is equivalent to doubling the transmitter power (3 dB). The actual gain over a half-wave dipole when the antenna is at a practical height above ground will depend on the way in which the radiation resistance of the long-wire antenna and the dipoles being compared are affected by the height. The exact way in which the radiation resistance of a long wire varies with height depends on its length. In general, the percentage change in resistance is not as great as in a half-wave antenna. This is particularly true at heights greater than one-half wavelength. The nulls bounding the lobes in the directive pattern of a long wire are fairly sharp and are frequently somewhat obscured by irregularities in the pattern.

The non-resonant long wire antenna used in the present invention is terminated at the far end in a resistance equal to its characteristic impedance. Thus, the incident waves are absorbed by the resistor rather than being reflected. Such an antenna is called a traveling wave antenna. The transmitter end is like the feed system for other long-wire antennas, but the far end is grounded through a terminating resistor that has a resistance equal to the characteristic impedance of the antenna. When the wire is 20 to 30 feet above the ground, as in the present invention, the character impedance is approximately 500–600 ohms.

The radiation pattern for the long wire antenna is comprised of four major lobes positioned at angles of ±36 degrees from the long wire. There are also four minor lobes—the strongest of which is −5 dB below the major lobes—at angles of ±75 degrees from the long wire. As the wire length is made longer, the angle of the main lobes pull in tighter (i.e. towards the wire). As the lobes pull in towards the wire, the number of minor lobes increases. At 5 wavelengths, there are still four main lobes, but they are at angles of ±22 degrees from the wire. Also, the number of minor lobes increases to sixteen. The minor lobes are located at ±47, ±62, ±72, and ±83 degrees with respect to the wire. The minor lobes tend to be −5 to −10 dB below the major lobes.

In the present invention, a non-linear fixed beam array antenna 10 is coupled to a receiver (not shown) and is located on the underside of a train car (not shown) such that it may be laterally displaced in parallel with the leaky coaxial cable 4 as indicated by the left and right arrows 13 in FIG. 1. The non-linear fixed beam array antenna 10 may alternatively be perpendicularly disposed with respect to the leaky coaxial cable 4 according to the requirements of the particular application. The distance from the antenna 10 to the cable 4 is the focal length FL of the antenna system 1, which is a known quantity (approximately 9" in the preferred embodiment) and which is used to determine the design parameters of the antenna system 1 as will be described in detail below. Ideally, the distance from the antenna 10 to the cable 4 is the same (and is equal to FL) regardless of the lateral movement of the antenna 10 with respect to the cable 4. Thus, the antenna 10 will always be a distance FL from the cable 4 and will as a result always be focused on the transmitting cable 4 throughout operation of the system; i.e., as the locomotive car on which the antenna 10 is mounted traverses the train track along which the cable 4 is located. In applications where such an ideal situation can not be met, the second embodiment, described in greater detail below, may be utilized.

Figure 2:
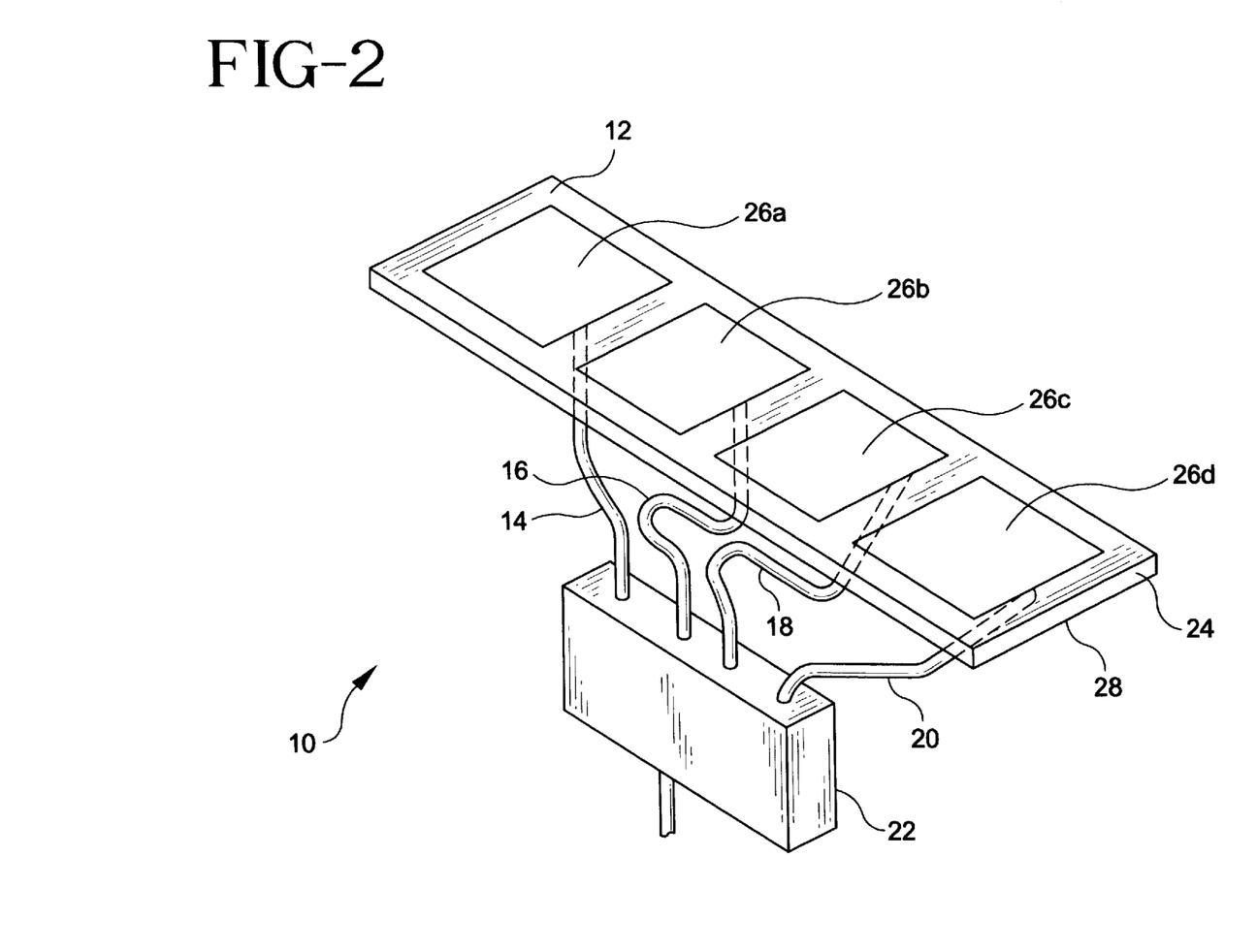
FIG. 2 is a perspective view of the first embodiment of an antenna of the present invention.

FIG. 2 illustrates the non-linear fixed beam array antenna 10 in accordance with the teachings of the present invention.

The antenna 10 comprises a patch array grid 12 connected by four coaxial feed lines 14, 16, 18 and 20 to a power divider 22.

The patch array grid 12 is comprised of a dielectric substrate 24, which is typically made from ROGERS DUROID or a comparable substrate material. Four copper patch elements 26a, 26b, 26c, and 26d are located on the dielectric substrate 24 in a linear fashion, as shown, and are evenly spaced apart by an integral number of wavelengths of the particular frequency being used. In one embodiment, the antenna system 1 is designed to operate at approximately 2.4 GHz which requires that the inter-element spacing be 3.827 inches. The patch elements 26 are fabricated from copper in a method well known in the art for fabricating microstrip patches for array antennas. A ground plane 28 is located on the side of the dielectric substrate 24 opposite the patch elements 26a, 26b, 26c, and 26d.

The coaxial feedlines 14 and 20, which are coupled to the outer two micro strip patch elements 26a and 26d, respectively, are of equal length. Thus, an electromagnetic signal emanating from a point centrally located below the non-linear fixed beam array antenna 10 (i.e., F) will arrive at substantially the same time and in substantially in phase at each of the microstrip patch element 26a and 26d. Each signal is coherently added together in order to increase the gain of the received signal without causing destructive interference therebetween.

The coaxial feed lines 16 and 18, which are coupled to the two inner patch elements 26b and 26c, respectively, function as delay lines with respect to the coaxial feed lines 14 and 20. The delay created by coaxial feed lines 16 and 18 is calculated to be equivalent to the difference in time between the arrival of the electromagnetic wave at the inner elements and its arrival at the outer elements. The delay in phase created by feed lines 16 and 18 permits the electromagnetic wave from the inner two elements to be coherently added to the electromagnetic wave from the outer two elements. Thus, the effective gain of the antenna system 1 is dramatically increased.

Figure 3:
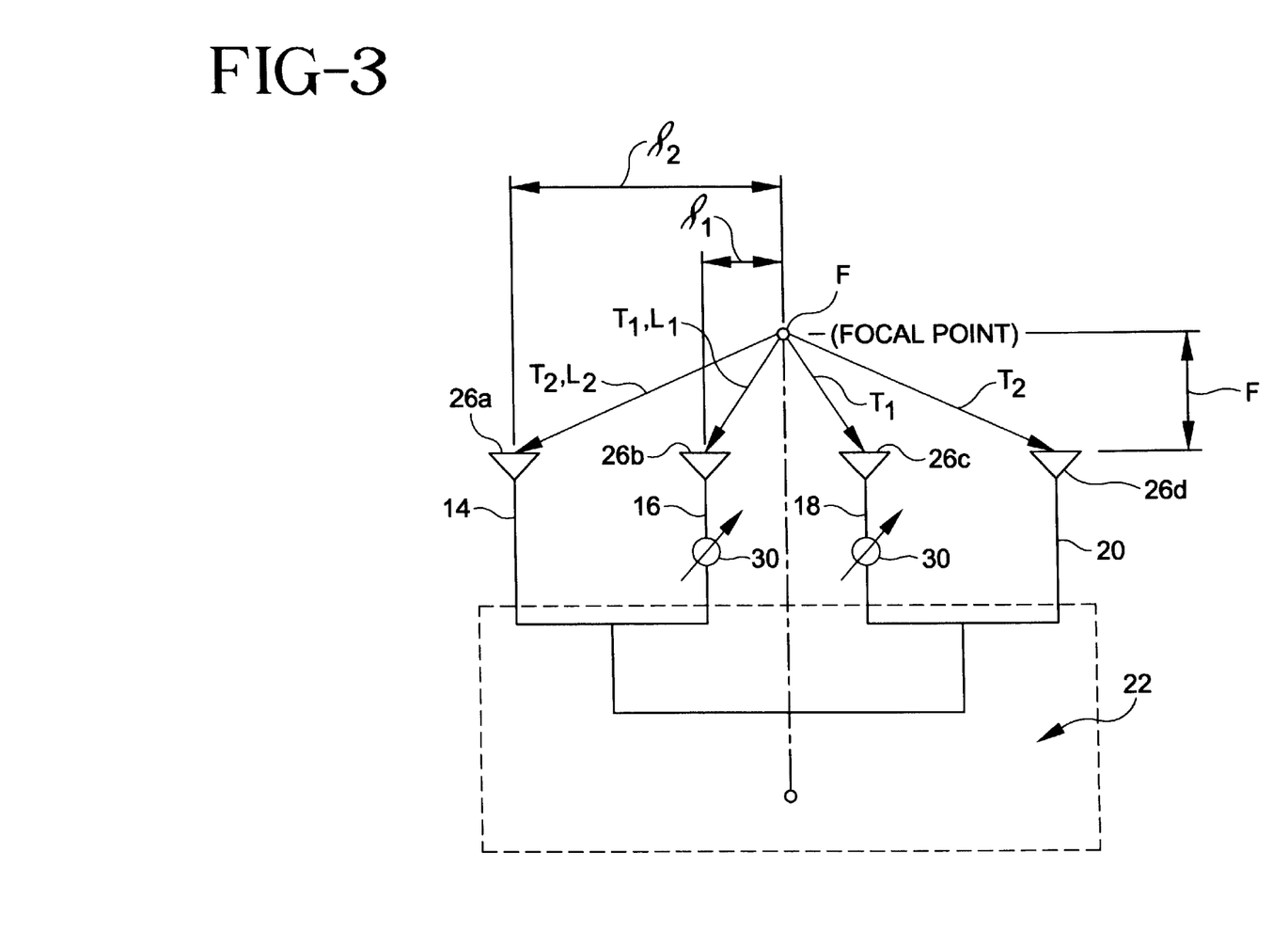
FIG. 3 is a diagram illustrating the principles of the present invention.

FIG. 3 illustrates this principle of operation. T1 is the time required for an electromagnetic wave to travel from the focal point F to each of the two inner patch elements 26b and 26c. T2 is the time required for the electromagnetic wave to travel from the focal point F to each of the two outer patch elements 26a and 26d. By delaying the phase of the signal traveling through the two inner patch elements 26b and 26c by the amount T2−T1, the signals representative of the incident waves arrive at the corporate feed network substantially in phase and the gain of the antenna system 1 is substantially increased.

The location along a center line CL of the focal point F is thus a function of the phase shift implemented by the phase shifters 30 on each of the two inner patch elements 26b, and 26c in accordance with the following formulation:

$$\Delta L = L_2 - L_1$$
$$= \sqrt{F^2 + l_1^2} - \sqrt{F^2 + l_2^2}$$

where L is the distance from the center line to the patch center. Moreover, the phase delay is provided as follows:

$$\text{Phase delay} = \frac{360° \Delta L}{\lambda_o}$$

where $\lambda_o$=free space wavelength.
The cable length is provided as $$\text{Cable length} = \frac{(\text{Phase delay})\lambda_d}{360°}$$

where $\lambda_d$=wavelength in the cable.

As the phase shift in each of the two inner patch elements, 26b and 26c, is diminished, the focal point F is extended further from the antenna, and as the phase shift in each of the two inner patch elements, 26b and 26c, is increased, the focal point F is brought closer to the antenna. Thus, in any given application, the phase shift is readily calculated once the location of the focal point F, and the position of each microstrip patch element is known.

The dimensions of the patch elements are determined as a function of the frequency of operation of the antenna as follows:

$$\text{Patch length } L = \frac{0.49\lambda_o}{\sqrt{\varepsilon_r}}$$

where $\lambda_o$=free space wavelength at the center frequency.

$$\lambda_o = (11.803 \text{ in.})/2.467 \text{ GHz}$$

The patch width $w \approx 60\lambda_o/\text{Rin}$ where Rin is the input impedance to the microstrip patch element, typically 50Ω.

The separation of the patch elements is also determined as a function of the frequency of operation of the antenna. A separation of $0.8\lambda_o$ was determined experimentally for maximum directivity with minimal pattern degradation. It is to be noted that the interelement spacing is less than a full wavelength ($\lambda_d$) due to the properties of the dielectric.

The number of patch elements may vary in accordance with a particular application. In the embodiment illustrated in FIGS. 1–3, the number of patch elements was selected as four since this number provided the required gain while yielding a physical profile small enough to be located on the desired platform. Thus, the number of patch elements required for a given application will be a function of the gain required as well as the physical constraints of the application.

Other configurations of patch elements may be used within the spirit and scope of the present invention in addition to the preferred linearly arranged embodiment. In addition, shapes other than the flat substrate described herein may be used if required by the physical profile of the system. However, the signals obtained from each microstrip patch element must be delayed by the proper amount so that they may be coherently added without appreciable destructive interference.

The antenna of the present invention, while described with reference to a receive mode of operation, operates reciprocally and is capable of transmitting a waveform to the focal point F in accordance with known principles as applied to the arrangement of the present invention. Thus, a signal input to the power divider 22 is uniformly split among the four patch elements 26a, 26b, 26c, and 26d for radiation therefrom. The signals fed to the two inner patch elements 26b and 26c are phase shifted as described above in order that a receive antenna located at the focal point F will be able to coherently add all four waveforms together without an appreciable amount of destructive interference.

In such a system, the signal from the transmitter is evenly divided with uniform amplitude taper across each element in order to maximize the gain at a specific focal point F in the near field. Beam shaping can be accomplished by utilizing a non-linear amplitude taper to control sidelobe radiation. It is also possible to increase the depth of field by varying the phase taper across the patch elements in two orthogonal planes. In this manner, a planar array could be focused at point "A" in one plane, and point "B" in the orthogonal plane. Similarly, schemes may be devised to shape a focal region in these dimensions.

Figure 4:
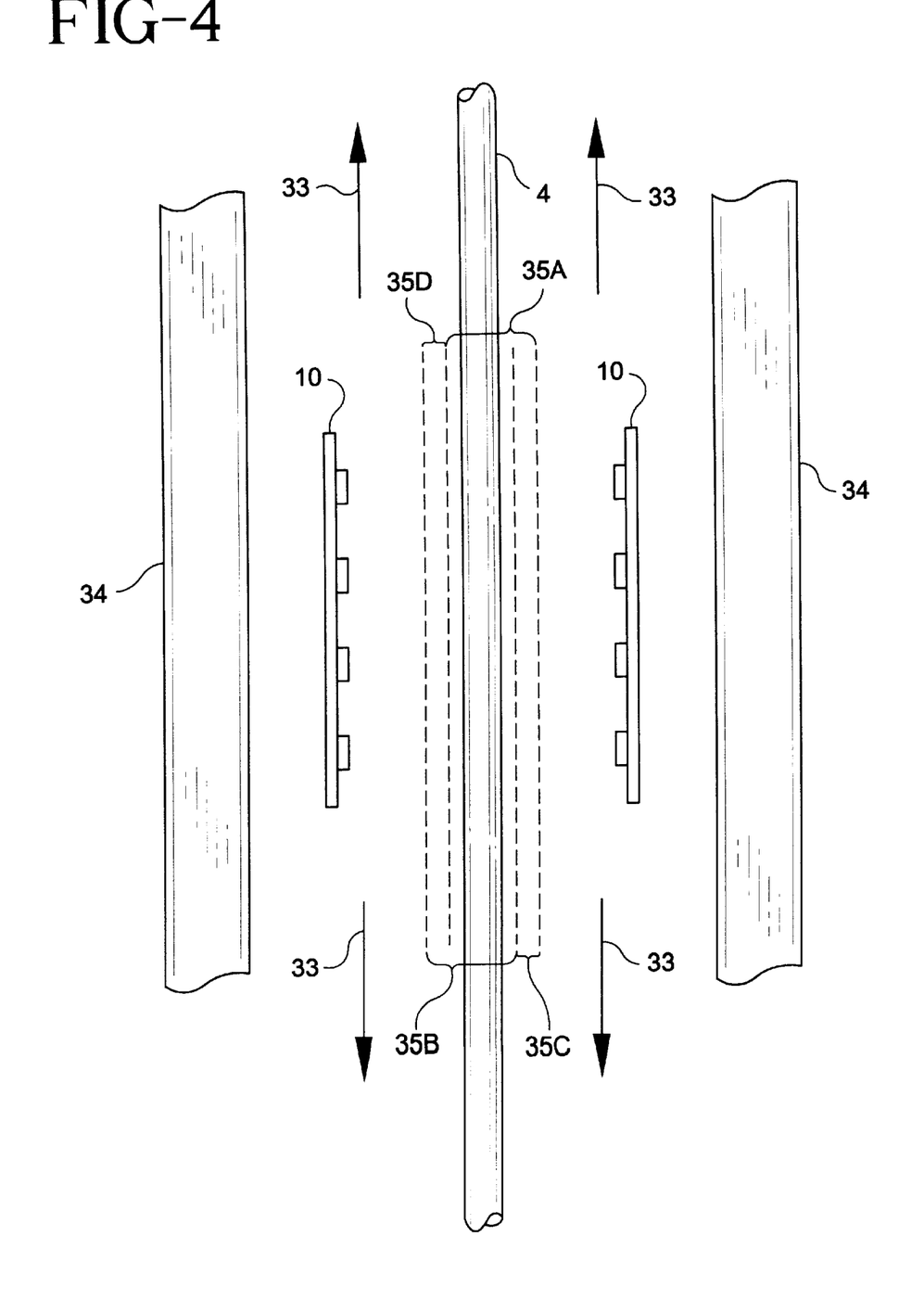
FIG. 4 is a diagram illustrating the placement of two non-linear fixed beam array antennas of the present invention with respect to a leaky coaxial cable and a set of train tracks.
Figure 5:
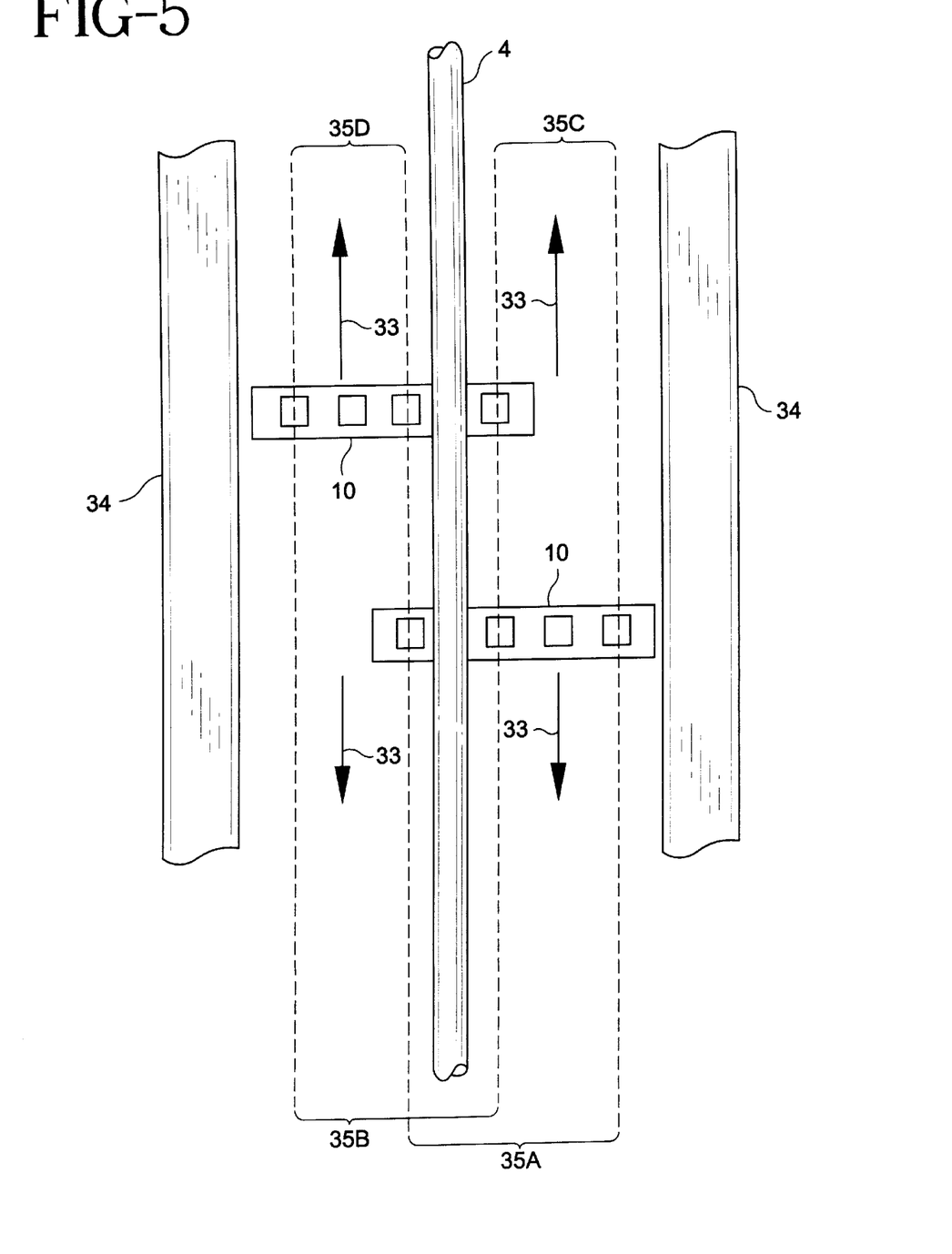
FIG. 5 is a diagram illustrating an alternative placement of two non-linear fixed beam array antennas of the present invention with respect to the leaky coaxial cable and the set of train tracks.

In a second embodiment of the present invention, two or more non-linear fixed beam array antennas 10 described above may be employed with a transmitting antenna comprising the leaky coaxial cable 4 shown in FIGS. 4 and 5. FIG. 4 depicts an arrangement wherein the antennas 10 are positioned in parallel with each other and the longitudinal axis or length of the leaky coaxial cable 4 which itself runs parallel to the set of train tracks 34. The direction of motion of the locomotive and consequently the antennas 10 attached to the locomotive is shown by arrows 33. FIG. 5 depicts an alternative embodiment wherein the antennas 10 are positioned perpendicularly with respect to the length or longitudinal axis of the leaky coaxial cable 4. Again, the direction of motion of the locomotive and consequently the antennas 10 attached to the locomotive is shown by arrows 33. The number and orientation or positioning of the antennas 10 in relation to the leaky coaxial cable 4 may in practice vary according to the application and may assume virtually any angle with reference to other antennas 10 and with reference to the leaky coaxial cable 4. Such variations would be predetermined to yield the greatest performance with respect to such parameters as; the frequency of operation; distance between the antennas 10 and the leaky coaxial cable 4 (focal length F); the number of antennas 10 employed; and the distance between the antennas 10.

An advantage of using two or more antennas 10 in this embodiment is that the receiver may be provided with that signal comprising the greatest radio frequency power, selected from the output of each of the antennas 10 utilized. Since the antennas 10 as described above comprise a fixed focal length, as the distance between the leaky coaxial cable 4 and any one antenna 10 changes, the strength of the resulting radio frequency signal from that particular antenna 10 will vary as a consequence. However, the positioning of the antennas 10 with respect to the leaky coaxial cable 4 could be such that as the distance between one antenna 10 and the leaky coaxial cable 4 tends away from the ideal focal length F (i.e. that which produces the signal with the greatest radio frequency power) the distance between another antenna 10 and the leaky coaxial cable 4 tends towards the ideal focal length F which result in a stronger signal to be output from the latter antenna 10. Thus, the strength of the signals resulting from each antenna 10 may be compared, and the signal which exhibits the greatest radio frequency power may be applied to a receiver. In this way, a degree of immunity to variations in the distance between any one antenna 10 and the leaky coaxial cable 4 may be obtained. Such variations in the distance between any one antenna 10 and the leaky coaxial cable 4 are typically present in a locomotive application where, for instance, the locomotive displays lateral as well as vertical displacement in traversing a set of train tracks 34.

The method, which permits the use of two antennas 10 to increases the effective range of area over which the focal length requirements of the antennas 10 will be met, is illustrated in FIG. 4. Although the focal length of the antenna 10 is ideally described by a single line a fixed distance from the antenna 10, in practice, the focal length is more accurately represented by the area between two lines, as shown by reference numerals 35A and 35B in FIGS. 4 and 5. When the leaky coaxial cable 4 is positioned anywhere within these two lines the reception will be acceptable, albeit, strongest when the coaxial line is situated substantially in the center of these two lines. For instance, assuming the area between the dashed lines 35A represents the range of positions which the leaky coaxial cable 4 may occupy while still providing a signal of acceptable strength to the antenna 10 on the right in FIG. 4. Assuming further that the area between the dashed lines 35B represents the range of positions which the leaky coaxial cable 4 may occupy while still providing a signal of acceptable strength to the antenna 10 on the left in FIG. 4. Thus, by utilizing two antennas 10 positioned as shown in FIG. 4 the effective tolerance within which the leaky coaxial cable 4 may occupy while still providing a signal of acceptable strength has been increased by the sum of the areas denoted by 35C and 35D. Naturally, at some point as the leaky coaxial cable 4 traverses the two regions denoted by 35A and 35B the radio frequency signal from the antenna 10 on the right will weaken while the radio frequency signal from the antenna 10 on the left will strengthen thus requiring a means to select the strongest signal among those available.

The same analysis holds true for the configuration illustrated in FIG. 5 where the antennas 10 are arranged perpendicularly with respect to the leaky coaxial cable 4. Thus, by utilizing two antennas 10 positioned as shown in FIG. 5 the effective tolerance of positions within which the leaky coaxial cable 4 must occupy in order to provide a signal of acceptable strength is also increased by the sum of the areas denoted by 35C and 35D.

Figure 6:
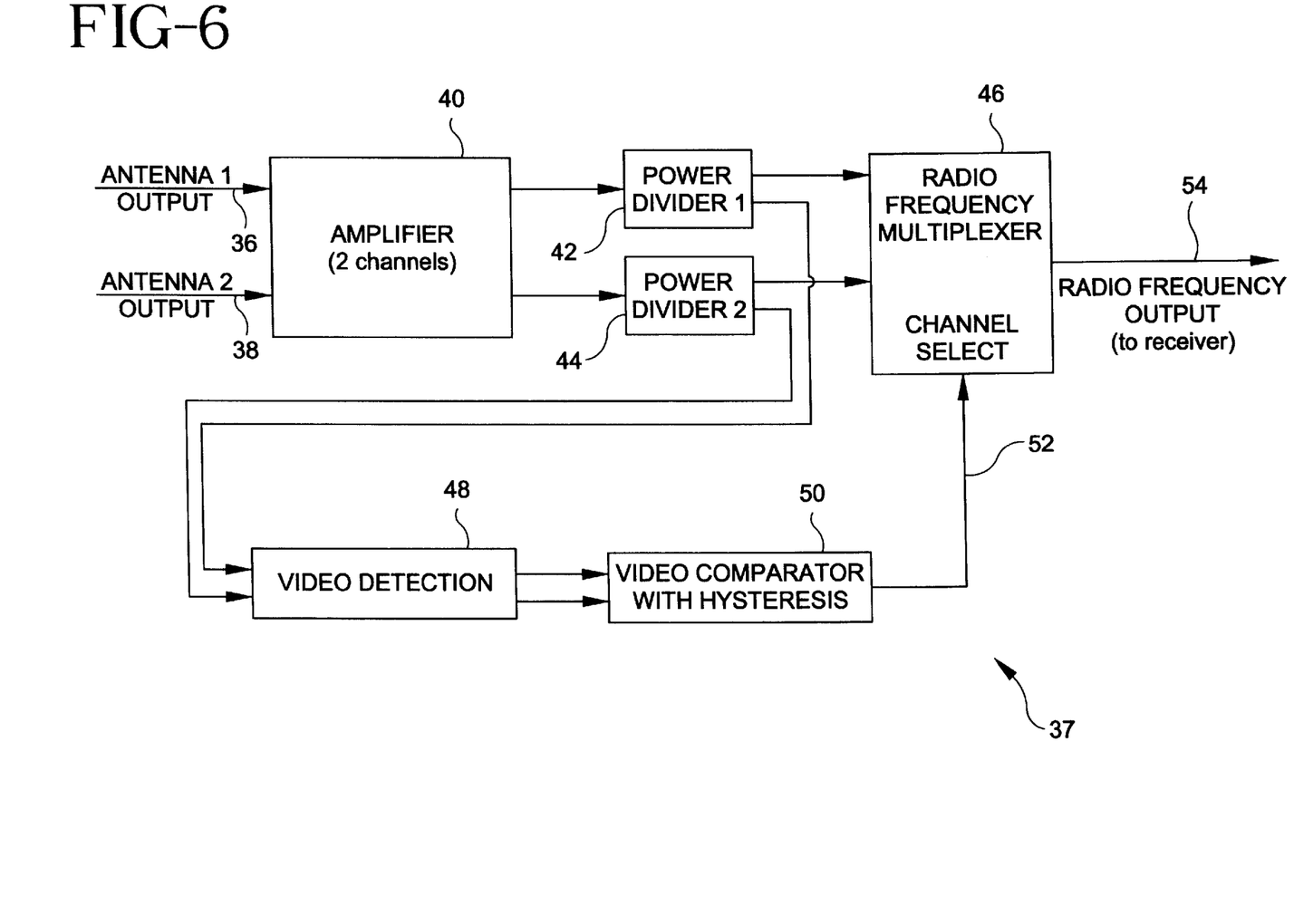
FIG. 6 is a block diagram illustrating a circuit which selects an antenna output comprising the greatest radio frequency power.

A selection means comprising a comparison circuit 37 which performs the function described above is shown in block diagram format in FIG. 6. The outputs 36 and 38 from two or more antennas 10 are input into a dual channel amplifier 40 comprising one or more stages per channel which typically provides 20 dB of gain per channel. The two resulting amplified radio frequency signals are then applied to a set of power dividers 42 and 44, each of which split and isolate the radio frequency signal derived from each antenna 10 into two radio frequency signals of substantially the same characteristics. One set of the divided radio frequency signals which represent each antenna 10 is applied to a radio frequency multiplexer 46. The second set of divided radio frequency signals representing each antenna 10 is applied to a video detection function 48, which provides a detected video signal from the set of two divided radio frequency signals. The detected video signal or intermediate control signal is then compared in a video comparator with hysteresis function 50. The video comparator with hysteresis function 50 determines the polarity of the detected video signal and provides a control signal 52 denoting that radio frequency signal comprising the greatest amplitude. It is generally more efficient in terms of the number and cost of individual circuit components to compare the amplitudes of video signals resulting from the diode detection of corresponding radio frequency signals than to directly compare the relative strengths of the radio frequency signals. The control signal 52 causes the radio frequency multiplexer 46 to switch that divided radio frequency signal which exhibits the greatest radio frequency power to the radio frequency output 54 and thus to the receiver (not shown).

Figure 7:
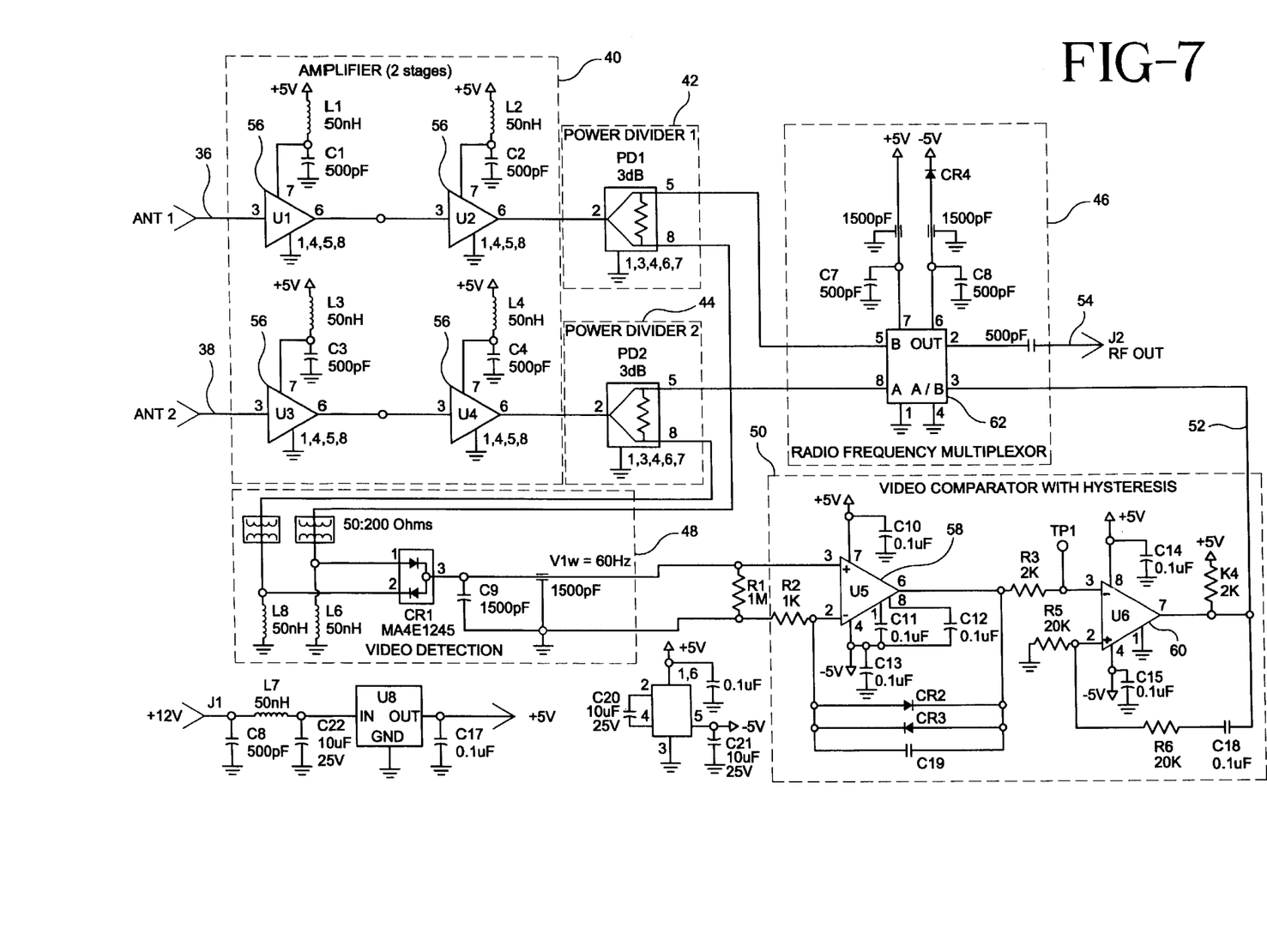
FIG. 7 is a detailed schematic representation of the circuit of FIG. 4.

The comparison circuit 37 is shown in greater detail in FIG. 7. The amplifier function 40 is, in the embodiment illustrated, performed by two stages of radio frequency amplifiers 56 per channel which results in approximately a 20 dB gain per channel.

The amplified radio frequency signals output by the amplifier 40 are next applied to the power dividers 42 and 44 which, in the embodiment shown, are comprised of standard commercially available high frequency components. The divided radio frequency signals are then applied to the video detection function 48 which is performed, in the embodiment shown, by a device which employs diode detectors.

Diode detectors, such as those used in the video detector function 48, have typically been used for the extraction of information from modulated radio frequency signals wherein the modulated signal is stripped from the carrier. The detection simply involves the generation of a voltage proportional to the peak amplitude of the radio frequency signal. This technique, which essentially tracks the amplitude of a signal, is far simpler than measuring the power of a radio frequency signal which typically involves a number of transistors, zener diodes, and possibly a current source. The design becomes even more involved for frequencies above a few megahertz.

The diode detection circuit used in the video detection function 48 of the present invention utilizes a surface mounted low barrier x-band Schottky diode. The features of this diode comprise a low noise figure (5.7 dB at x-band), a high detector sensitivity (55 dBm) and a low capacitance (0.25 pF).

The MA4E1245 is a low barrier n-type silicon Schottky diode assembled in a surface mount plastic package. It is designed for service as a high performance mixer and detector diode at frequencies from VHF through the X-band. As used in the video detection function 48 of FIG. 7, two radio frequency signals are applied to two input pins, 1 and 2, of the MA4E1245. The internal configuration of Schottky diodes is such that the relative amplitudes of the two radio frequency signals as detected by the diodes compete with each other. This results in the output signal from the MA4E1245 providing a positive polarity signal or a negative polarity signal depending upon which radio frequency signal displays the greatest amplitude. For instance, if the radio frequency signal applied to the Schottky diode connected to pin 1 of the MA4E1245 maintains an amplitude greater than the amplitude of the radio frequency signal applied to the Schottky diode connected to pin 2 of the MA4E1245, then the resulting polarity of the signal output from the MA4E1245 at pin 3 would be positive. Thus, the condition where the radio frequency signal applied to pin 1 has the greatest amplitude is correctly represented with a positive polarity at the output of the MA4E1245. The converse, wherein the radio frequency signal applied to pin 2 provides the greater amplitude results in a signal of negative polarity which is output at pin 3.

The detected video signal output by the video detection function 48 is then applied to the video comparator function 50 comprised of an operational amplifier 58 which provides high gain and voltage limiting of the detected video signal. The limited video signal is then applied to a second operational amplifier 60 configured as a comparator, which provides the control signal 52 to the radio frequency multiplexer 46 function. The second operational amplifier 60 employs AC coupling in a feedback path as shown by capacitor C18 and is designed to provide approximately 2.5 volts of hysteresis which limits the switching rate to no less than approximately 8 milliseconds. The control signal 52 denotes which of two detected video signals exhibits the greatest amplitude and as a consequence which of the corresponding two antenna outputs 36 and 38 exhibits the greatest radio frequency power. The hysteresis is designed to restrict rapid fluctuations in the control signal 52 when the RF power at the two antenna are similar. The radio frequency multiplexer 46 is comprised of a commercially available radio frequency switch 62 which selects between the two divided radio frequency signals based upon the control signal 52.

While various changes and modifications may be made in the detailed construction, it is understood that such changes or modifications will be within the spirit and scope of the present invention, as it is defined by the appended claims.

We claim:

1. An antenna system comprising:

a plurality of antennas, each of said antennas outputting an associated radio frequency signal, said plurality of antennas comprising a plurality of fixed beam array antennas focused at a focal point located in a near field region of said plurality of fixed beam array antennas, each of which comprises:

a plurality of conductive patch elements arranged in a linear fashion and juxtaposed such that at least one of said patch elements is located closer to a focal point of said patch elements than at least one other of said patch elements;

means for coherently adding signals obtained from each of said patch elements comprising a power divider; and means for phase shifting, prior to being added, said phase of said signal obtained from each patch element located relatively closer to said focal point relative to said phase of said signal obtained from each patch element located relatively further away from said focal point such that signals are coherently added together substantially in phase by said means for coherently adding signals, said means for phase shifting being coupled between said plurality of patch elements and said means for coherently adding signals; and means for selecting from said plurality of antennas said radio frequency signal comprising the greatest power and outputting said selected radio frequency signal.

2. An antenna system comprising:

a plurality of antennas, each of said antennas outputting an associated radio frequency signal, said plurality of antennas comprising a plurality of fixed beam array antennas focused at a focal point located in a near field region of said plurality of fixed beam array antennas each of which comprises:

a plurality of conductive patch elements arranged in a linear fashion for transducing electromagnetic energy with corresponding electric signals, said patch elements juxtaposed in mirror symmetrical pairs about said focal point such that at least one of said mirror symmetrical pairs is located closer to said focal point than at least one other of said mirror symmetrical pairs;

means for coherently adding signals obtained from each of said patch elements together comprising a power divider; and means for phase shifting, prior to being added, said phase of said signal obtained from each patch element located relatively closer to said focal point relative to said phase of said signal obtained from each patch element located relatively further away from said focal point such that said signals are coherently added together substantially in phase by said means for coherently adding signals, said means for phase shifting being coupled between said plurality of patch elements and said means for coherently adding signals; and means for selecting from said plurality of antennas said radio frequency signal comprising the greatest power and outputting said selected radio frequency signal.

3. An antenna system comprising:

a plurality of antennas, each of said antennas outputting an associated radio frequency signal, said plurality of antennas comprising a plurality of non-linear fixed beam array antennas for receiving an electromagnetic beam emanating from a source located at a near field region of said plurality of non-linear fixed beam array antennas each of which comprises:

a plurality of conductive patch elements for transducing electromagnetic energy into corresponding electrical signals, said patch elements being juxtaposed linearly along a substantially flat substrate such that at least one of said patch elements is located closer to a focal point than at least one other of said patch elements;

means for adding signals which comprises a power divider for coherently adding together said signals obtained from each of said patch elements; and means for phase shifting coupled between said plurality of patch elements and said signal adding means for shifting, prior to adding, said phase of said signal obtained from each patch element located relatively closer to said focal point relative to said phase of said signal obtained from each patch element located relatively further away from said focal point such that said signals are coherently added together substantially in phase by said means for adding signals and said electromagnetic beam is focused on said array; and means for selecting from said plurality of antennas said radio frequency signal comprising the greatest power and outputting said selected radio frequency signal.

4. An antenna system comprising:

a plurality of antennas, each of said antennas outputting an associated radio frequency signal; and means for selecting from said plurality of antennas said radio frequency signal comprising the greatest power and outputting said selected radio frequency signal, said means for selecting comprising:

means for comparing amplitudes of each radio frequency signal and outputting a control signal indicative of that radio frequency signal comprising the greatest amplitude, said means for comparing amplitudes comprising means for dividing said radio frequency signal into a first set of intermediate radio frequency signals and a second set of intermediate radio frequency signals corresponding to each of said antennas; and means for switching that radio frequency signal comprising the greatest amplitude based upon said control signal, said first set of intermediate radio frequency signals being applied to said means for switching and said second set of intermediate radio frequency signals being applied to said means for comparing amplitudes of each radio frequency signal, said means for switching outputting said radio frequency signal comprising the greatest amplitude, thereby outputting said radio frequency signal comprising the greatest radio frequency power.

5. An antenna system of claim 4, wherein said means for comparing amplitudes further comprises means for amplification adapted to amplify said radio frequency signals prior to said means for dividing said radio frequency signals.

6. An antenna system comprising:

a plurality of antennas, each of said antennas outputting an associated radio frequency signal; and means for selecting from said plurality of antennas said radio frequency signal comprising the greatest power and outputting said selected radio frequency signal, said means for selecting comprising:

means for comparing amplitudes of each radio frequency signal and outputting a control signal indicative of that radio frequency signal comprising the greatest amplitude, said means for comparing amplitudes comprising means for video detection of said radio frequency signals, said means for video detection comprising diodes adapted to output an intermediate control signal comprising a polarity indicative of said radio frequency signal comprising the greatest amplitude; and means for switching that radio frequency signal comprising the greatest amplitude based upon said control signal, and outputting said radio frequency signal comprising the greatest amplitude, thereby outputting said radio frequency signal comprising the greatest radio frequency power.

7. An antenna system of claim 6, wherein said means for comparing amplitudes further comprises means for generating a control signal indicative of said polarity of said intermediate control signal.

8. An antenna system comprising:

a plurality of antennas, each of said antennas outputting an associated radio frequency signal; and means for selecting from said plurality of antennas said radio frequency signal comprising the greatest power and outputting said selected radio frequency signal, said means for selecting comprising:

means for comparing amplitudes of each radio frequency signal and outputting a control signal indicative of that radio frequency signal comprising the greatest amplitude; and means for switching that radio frequency signal comprising the greatest amplitude based upon said control signal, and outputting said radio frequency signal comprising the greatest amplitude, thereby outputting said radio frequency signal comprising the greatest radio frequency power, said means for switching that radio frequency signal comprising the greatest amplitude comprising means for adding hysteresis adapted to restrict said control signal from changing unless a difference in said amplitudes of said radio frequency signals exceeds a predetermined threshold.

9. An antenna system of claim 8, wherein said means for adding hysteresis is performed by an operational amplifier comprising AC coupling between an output and a non-inverting input of said operational amplifier.

10. A method of increasing the performance of an antenna system, which comprises the steps of:

inputting radio frequency signals from a plurality of antennas, said step of inputting said radio frequency signals comprising the steps of:

positioning a plurality of fixed beam array antennas comprising a plurality of conductive patch elements in a predetermined pattern;

juxtaposing said plurality of conductive patch elements in a linear fashion such that at least one of said patch elements is located closer to a focal point of said conductive patch elements than at least one other of said conductive patch elements;

focusing said plurality of fixed beam array antennas at said focal point located in a near field region of said plurality of fixed beam array antennas;

adding signals obtained from each of said conductive patch elements coherently; and shifting a phase of said signals from said plurality of conductive patch elements, prior to being added, such that said signals may be coherently added together substantially in phase;

selecting that radio frequency signal which comprises the greatest radio frequency power; and outputting said radio frequency signal comprising the greatest radio frequency power.

11. A method of increasing the performance of an antenna system, which comprises the steps of:

inputting radio frequency signals from a plurality of antennas, said step of inputting said radio frequency signals comprising the steps of:

positioning a plurality of fixed beam array antennas comprising a plurality of conductive patch elements arranged in a linear fashion for transducing electromagnetic energy into corresponding electrical signals;

juxtaposing said plurality of conductive patch elements on each of said plurality of fixed beam array antennas in mirror symmetrical pairs about a focal point of said patch elements such that at least one of said mirror symmetrical pairs is located closer to said focal point than at least one other of said mirror symmetrical pairs;

focusing said plurality of fixed beam array antennas at said focal point located in a near field region of said plurality of fixed beam array antennas;

adding signals obtained from each of said conductive patch elements coherently; and shifting a phase of said signals from said plurality of conductive patch elements, prior to being added, such that said signals may be coherently added together substantially in phase;

selecting that radio frequency signal which comprises the greatest radio frequency power; and outputting said radio frequency signal comprising the greatest radio frequency power.

12. A method of increasing the performance of an antenna system, which comprises the steps of:

inputting radio frequency signals from a plurality of antennas;

selecting that radio frequency signal which comprises the greatest radio frequency power, said step of selecting comprising:

comparing amplitudes of each radio frequency signal, said step of comparing amplitudes comprising detecting via diodes said radio frequency signals and outputting an intermediate control signal comprising a polarity indicative of said radio frequency signal comprising the greatest amplitude;

outputting a control signal indicative of that radio frequency signal comprising the greatest amplitude;

switching that radio frequency signal comprising the greatest amplitude based upon said control signal; and outputting said radio frequency signal comprising the greatest amplitude, thereby outputting said radio frequency signal comprising the greatest power.

13. A method of claim 12, wherein said step of comparing amplitudes further comprises generating a control signal indicative of said polarity of said intermediate control signal.

14. A method of increasing the performance of an antenna system, which comprises the steps of:

inputting radio frequency signals from a plurality of antennas;

selecting that radio frequency signal which comprises the greatest radio frequency power, said step of selecting comprising:

comparing amplitudes of each radio frequency signal;

outputting a control signal indicative of that radio frequency signal comprising the greatest amplitude;

switching that radio frequency signal comprising the greatest amplitude based upon said control signal, said step of switching that radio frequency signal comprising the greatest amplitude comprising adding hysteresis adapted to restrict said control signal from changing unless a difference in said amplitudes of said radio frequency signals exceeds a predetermined threshold; and outputting said radio frequency signal comprising the greatest amplitude, thereby outputting said radio frequency signal comprising the greatest power.

15. A method of claim 14, wherein said step of adding hysteresis further comprises coupling an operational amplifier via AC means between an output and a non-inverting input of said operational amplifier.

* * * * *